No. 741,522. PATENTED OCT. 13, 1903.
B. F. MAYO.
MACHINE FOR INSERTING HEEL OR SOLE PROTECTORS.
APPLICATION FILED OCT. 27, 1898.
NO MODEL. 5 SHEETS—SHEET 1.
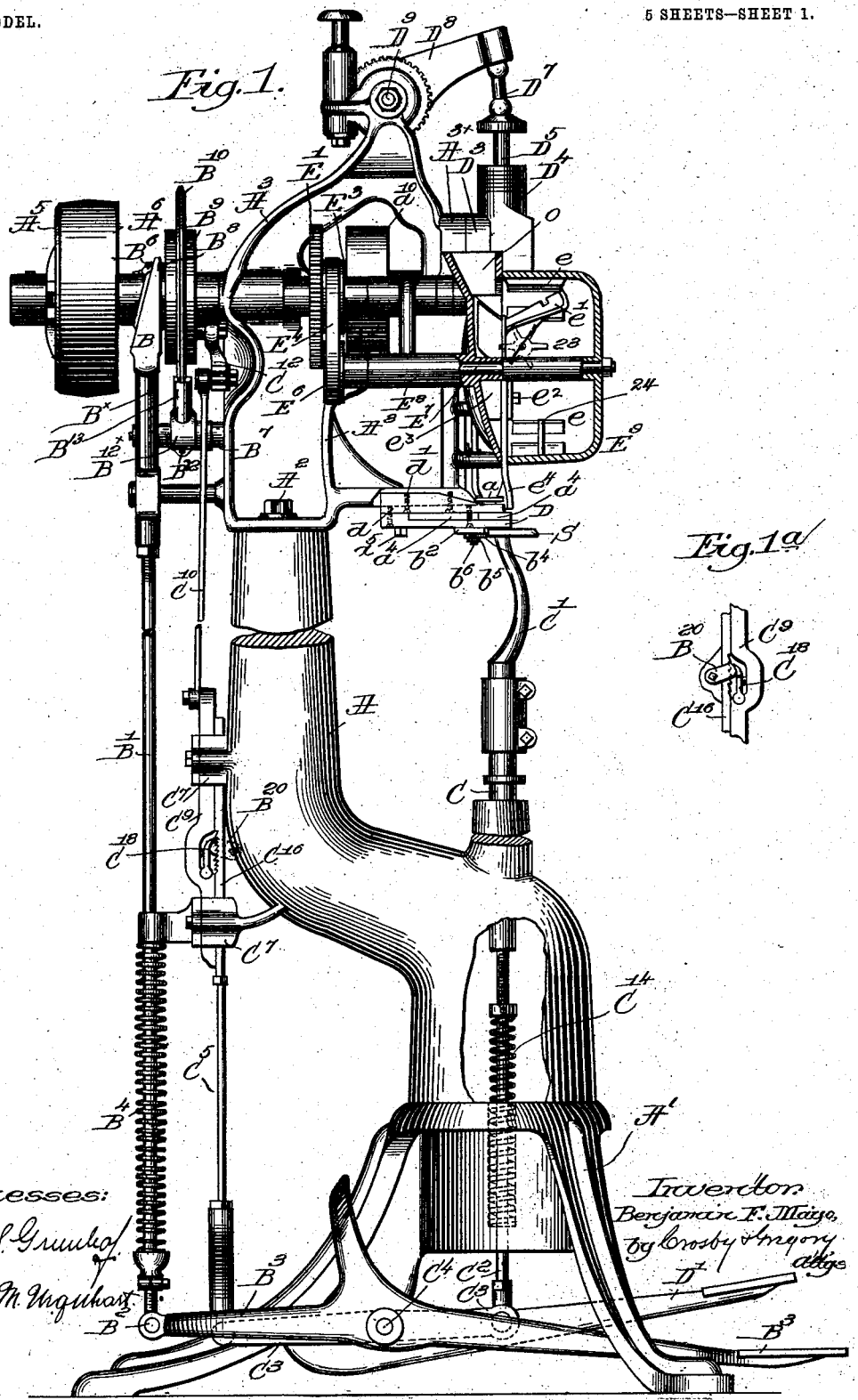

No. 741,522. PATENTED OCT. 13, 1903.
B. F. MAYO.
MACHINE FOR INSERTING HEEL OR SOLE PROTECTORS.
APPLICATION FILED OCT. 27, 1898.
NO MODEL. 5 SHEETS—SHEET 2.
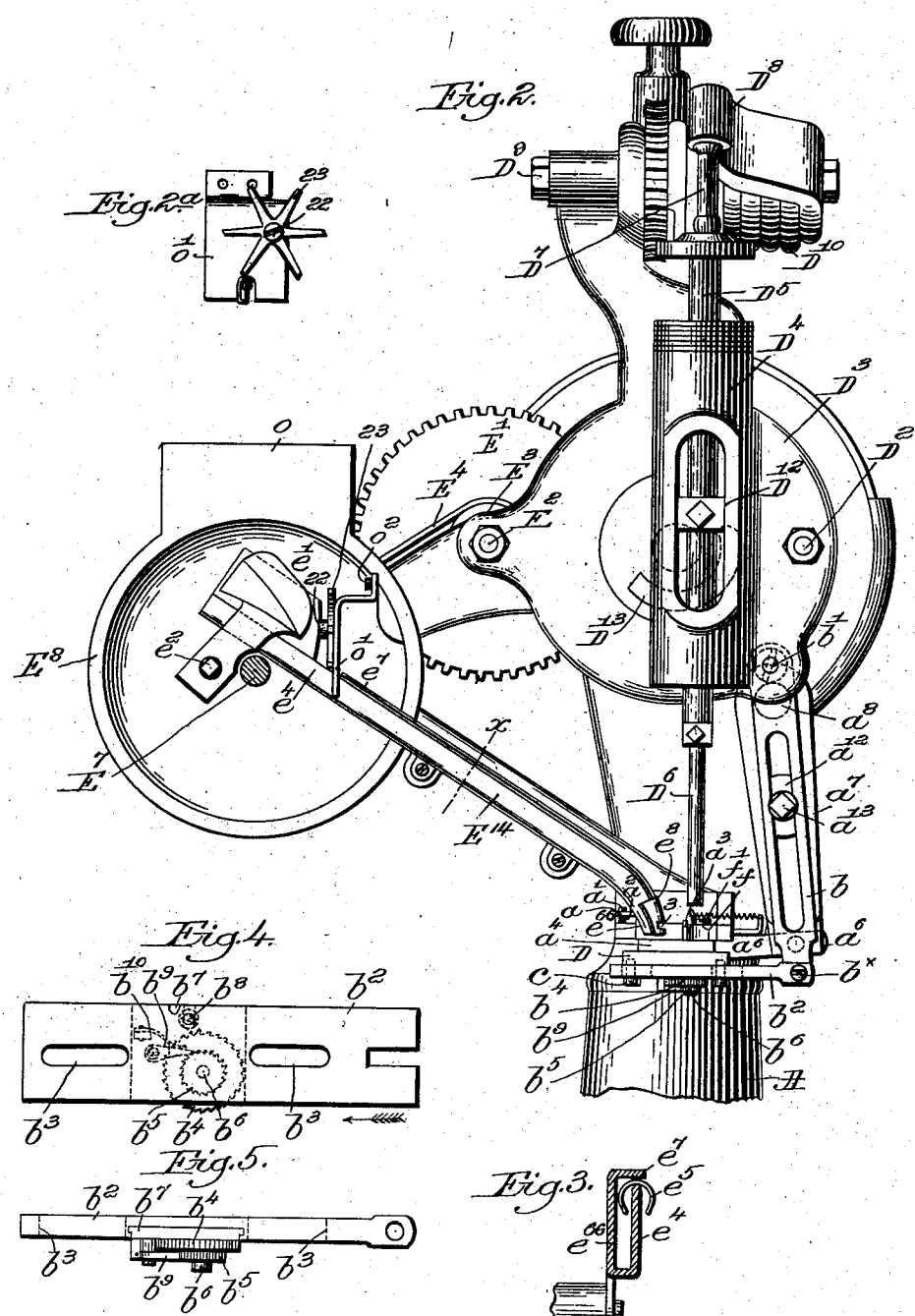

No. 741,522. PATENTED OCT. 13, 1903.
B. F. MAYO.
MACHINE FOR INSERTING HEEL OR SOLE PROTECTORS.
APPLICATION FILED OCT. 27, 1898.
NO MODEL. 5 SHEETS—SHEET 3.
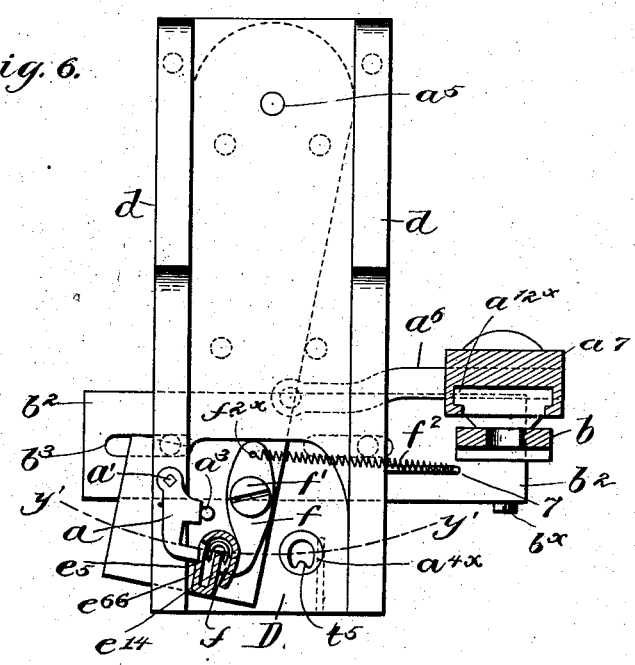
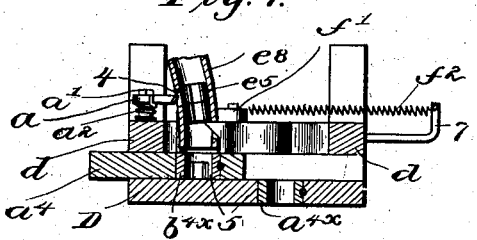
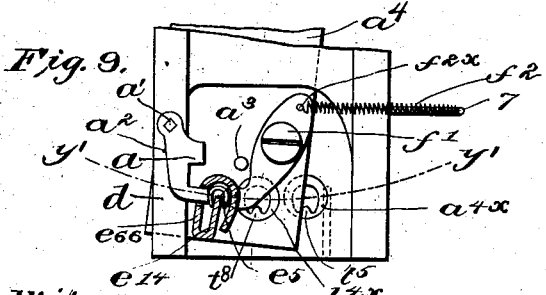
Witnesses.
Inventor
Benjamin F. Mayo
by Crosby & Gregory
attys.

No. 741,522. PATENTED OCT. 13, 1903.
B. F. MAYO.
MACHINE FOR INSERTING HEEL OR SOLE PROTECTORS.
APPLICATION FILED OCT. 27, 1898.
NO MODEL. 5 SHEETS—SHEET 4.
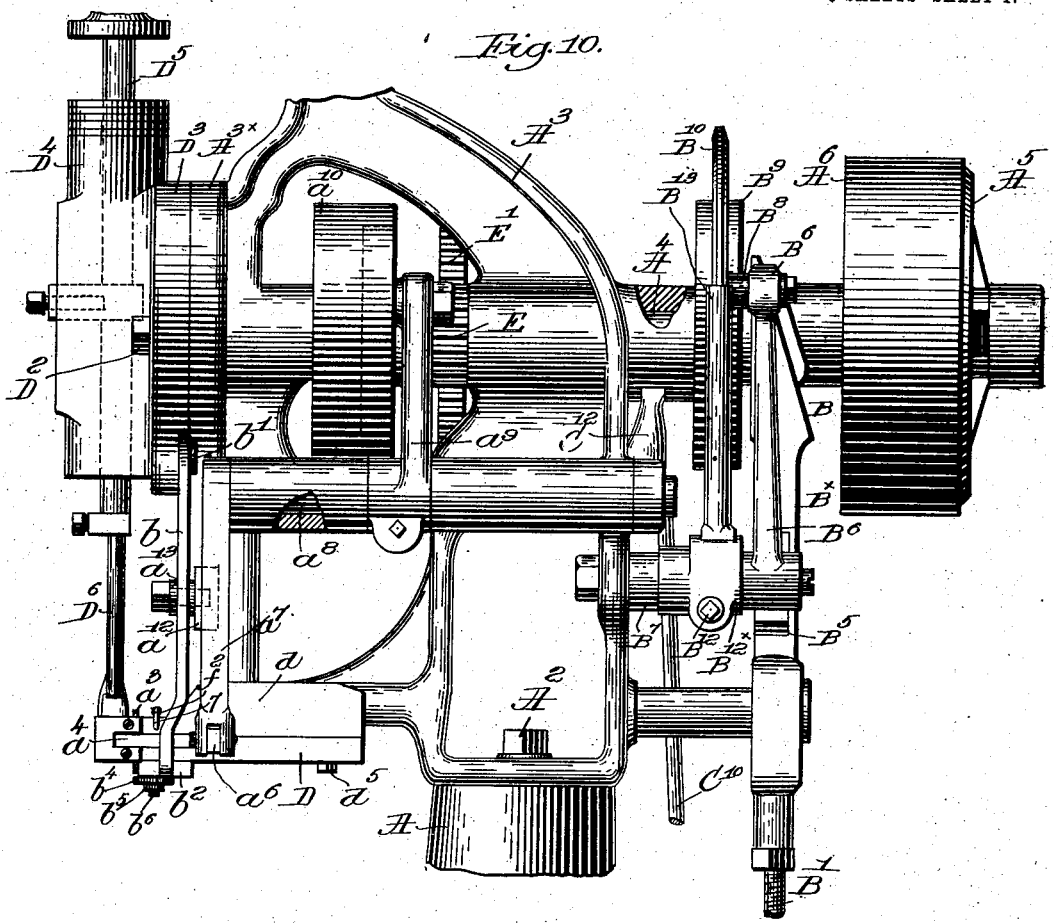
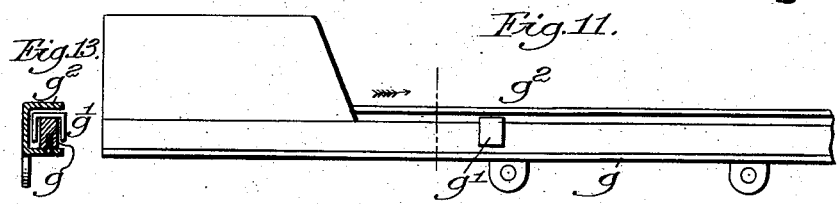
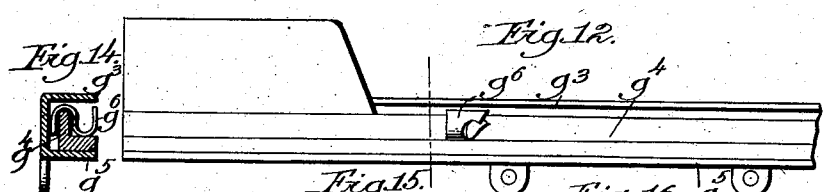
Witnesses:
Fred S. Greenleaf
James M. Urquhart
Inventor:
Benjamin F. Mayo,
by Crosby & Gregory
attys.

No. 741,522. PATENTED OCT. 13, 1903.
B. F. MAYO.
MACHINE FOR INSERTING HEEL OR SOLE PROTECTORS.
APPLICATION FILED OCT. 27, 1898.
NO MODEL. 5 SHEETS—SHEET 5.
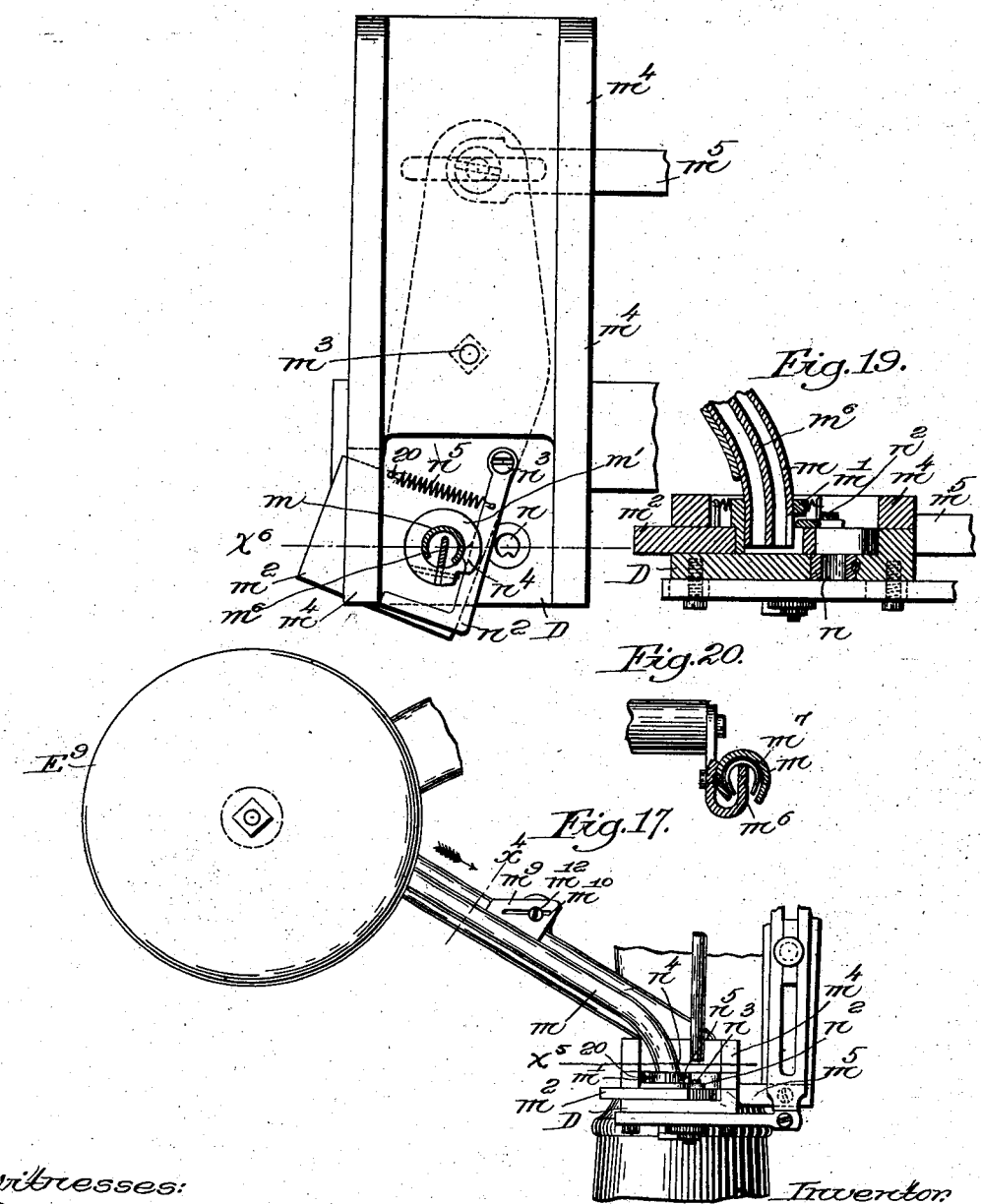

No. 741,522. Patented October 13, 1903.

UNITED STATES PATENT OFFICE.

BENJAMIN F. MAYO, OF SALEM, MASSACHUSETTS, ASSIGNOR, BY MESNE ASSIGNMENTS, TO THE UNITED SHOE MACHINERY COMPANY, A CORPORATION OF NEW JERSEY.

MACHINE FOR INSERTING HEEL OR SOLE PROTECTORS.

SPECIFICATION forming part of Letters Patent No. 741,522, dated October 13, 1903.

Application filed October 27, 1898. Serial No. 694,681. (No model.)

*To all whom it may concern:*

Be it known that I, BENJAMIN F. MAYO, of Salem, county of Essex, State of Massachusetts, have invented an Improvement in Machines for Inserting Heel or Sole Protectors, of which the following description, in connection with the accompanying drawings, is a specification, like characters on the drawings representing like parts.

The exigencies of trade in boots and shoes require that the heels and soles be provided with protectors to lessen the rapidity of the wear of the same, and hence I have devised a practical machine for doing this work automatically and rapidly. These protectors, commonly of horseshoe or other irregular contour or shape and composed of metal, are driven in the face or tread of the heel or sole of a shoe throughout more or less of the surface thereof. I find that in driving this class of protectors the stock must be firmly clamped when the protector is being driven into it; otherwise the stock is distorted laterally, leaving bulges or ridges, which interfere with subsequent trimming operations, especially in the heel, where the protectors are driven close to the edge. I have devised a raceway to conduct the protectors, said raceway being so constructed that slight variation in size and shape of the protectors does not interfere with their free movement toward the delivery end of said raceway. I have also devised special devices to insure the delivery of said protectors singly and without any liability of delivering two protectors at the same time, my delivery apparatus being devised to act against the side of the second protector from the end of the raceway preparatory to discharging the endmost protector from the raceway into a carrier, which quickly puts said protector into position to be driven therefrom, directly through a nose or foot plate, into the heel or sole lying on a horn, which at that time is elevated to firmly clamp the stock between it and said foot-plate.

In the form in which I have herein chosen to illustrate my invention the carrier is made as a solid piece of metal having a space shaped to receive within it the protector of whatever form externally, and said carrier has projected from it into said space an inner guide or tongue to enter the space between the wings or open end of the protector. The fin of the raceway straddled by the protector, and which acts to guide the protector from the receiving end of the raceway into position to be discharged from the raceway, is herein shown as having a quarter-turn, so that the protector is turned by the raceway and made to assume a position wherein its upper and lower edges stand substantially horizontal with the openings between the wings or ends of the protectors exposed preferably toward the operator. The delivery end of the raceway is shaped to substantially surround or embrace the protector externally, and said delivery end presents a positioning portion which enters between said wings or open end and stands in the space of the protector, said positioning portion registering each protector in position with relation to the feed which acts against the edge of the sole or heel in feeding the material over the horn, so that the open ends of the protectors, which are delivered in succession from the end of said positioning portion, stand uniformly with relation one to the other.

The protectors are made to pass singly from the positioning portion of the raceway into a space of the carrier having an inner guide, which is alined with the positioning portion, when a protector is transferred from the raceway into the space of the carrier, and this inner guide remains in position in the open end of the protector while it is being moved from a position opposite the end of the raceway into position above the driver-passage in the nose or foot plate, and the latter may have, as shown, an inner guide, which occupies such position as to receive upon its opposite sides the wings or open ends of the protectors as they are moved from the carrier into the passage in the nose or foot plate. Thus it will be seen that the protectors are positively controlled as to the position of their open ends or wings while leaving the raceway and throughout their subsequent movements by the machine until they arrive in position to be driven by the driver, and the inner guides of the carrier and of the bushing in the nose-plate act to position the open ends of the protectors throughout the race-driving operation. I prefer to eject the protector positively from the raceway into the protector-space of the carrier rather than let it drop by gravity, for thereby the speed of operation of the machine may be greatly enhanced.

The carrier shown in the drawings presents a suitable space for the reception of a protector, the said space being shaped to receive the exterior of the protector to be driven, and the nose or foot plate is also provided with a protector passage or throat (shown as made in a bushing) shaped internally to receive the protector; and by changing the carrier for one having a different-shaped space and the bushing for one having a different-shaped passage or throat and also the raceway, if necessary, the machine may readily be adapted to drive protectors of any desired irregular shape or contour.

In the machine shown in the drawings the protector when put into the space of the carrier is immediately covered, and it remains covered while the carrier takes the protector and puts it in position in line with the driver which is to drive it from the carrier, the covering of the protector obviating the overturning of the protector during this movement and preventing its accidental escape from the carrier in the rapid motions of the machine.

Figure 1 in side elevation and partial section represents a sufficient portion of the machine for inserting protectors to enable my invention to be understood. Fig. 1$^a$ is a detail showing the disengaging projection cooperating with the pawl or engaging device $C^{18}$. Fig. 2 is an enlarged front elevation of the upper part of the machine. Fig. 2$^a$ is a detail showing the dam and toothed wheel, to be described, operating to enable the protectors to be brought proper side up in order that they may get correctly onto the raceway. Fig. 3 is a section in the line $x$, Fig. 2. Figs. 4 and 5 are details of the feeding mechanism for the shoe. Fig. 6 shows the carrier and foot-plate, the carrier being in position to receive the protector from the positioning portion of the raceway shown in section, part of the actuating means for the carrier being also in section. Fig. 7 is a section in the line $y'$, Fig. 6, the protectors being represented as in elevation. Fig. 7$^a$ shows detached that one of the two like bushings which is contained in the foot-plate. Fig. 8 is a similar section to that shown in Fig. 7, but with the carrier in position to deliver its protector in the bushing of the foot-plate, the protector being represented as in elevation. Fig. 9 is a view of a portion of the devices shown in Fig. 6, but with the carrier shown as between the positions Fig. 8 and Fig. 6. Fig. 9$^a$ is a detail showing in plan view part of the carrier detached, the ejector or let-off being omitted. Fig. 10 shows an enlarged right-hand side elevation of the upper part of the machine. Figs. 11 and 12 show modified forms of raceways. Figs. 13 and 14 show, respectively, cross-sections of the raceways represented in Figs. 11 and 12. Fig. 15 shows, enlarged, the protector represented in Figs. 12 and 14. Fig. 16 shows in section still another form of raceway. Fig. 17 represents a front elevation of a modification to be described, wherein the carrier and raceway are connected together. Fig. 18 is a plan view, partly in section, taken on the line $x^5$ of Fig. 17. Fig. 19 is a sectional view taken on the line $x^6$ of Fig. 18; and Fig. 20 is a sectional view of the raceway, taken on the line $x^4$ of Fig. 17.

The column A, standing on legs A', has bolted to it by bolts $A^2$ a head $A^3$, having bearing for a main shaft $A^4$, provided with a fast pulley $A^5$ and a loose pulley $A^6$, the latter being run continuously and adapted to pick up frictionally the fast pulley and rotate said shaft whenever the loose pulley is forced against it by the wedge B, carried by the bar $B^\times$, connected with a rod B', attached at $B^2$ to a treadle $B^3$, Fig. 1 showing the said treadle depressed at its front end as when the machine is running. A spring $B^4$, surrounding the rod B', acts to depress the wedge and free the loose pulley from the fast pulley whenever the foot is removed from the said treadle. The bar $B^\times$, carrying the wedge, has rack-teeth $B^5$, which engage sector-teeth on one arm of an elbow-lever $B^6$, mounted on a stud $B^7$, said lever having a roller or other stud $B^8$, which rests against the edge of a cam $B^9$ at one side of the brake-wheel $B^{10}$. The hub of the lever $B^6$ has clamped to it by a clamp-screw $B^{12}$ a hub $B^{12\times}$, which carries a brake-shoe $B^{13}$, which in the rotation of the cam $B^9$ after the operator has removed his foot from the treadle to stop the machine is permitted by the said cam, it acting through said lever $B^6$ to meet the brake-wheel and instantly stop the machine, so that the machine is always stopped with the parts in one position. When the operator moves the treadle to start the machine, the ascent of the rod B' moves the lever $B^6$ and effects the removal of the brake-shoe from the brake-wheel. The column receives a sliding shaft C, on the upper end of which is a horn C'. The lower end of shaft C has connected to it a rod $C^2$, joined to an arm of a lever $C^3$, pivoted at $C^4$, the rear end of said lever having attached to it a rod $C^5$, provided with a ratchet-toothed plate $C^{16}$, fitted to slide up and down in guideways $C^7$, the teeth of said plate being adapted to be engaged by a suitable pawl or engaging device $C^{18}$, mounted on a plate $C^9$, located in said guideways and connected to the lower end of a rod $C^{10}$, attached to an elbow-lever $C^{12}$, pivoted on the head and having a roller or other stud which enters an irregular groove at the inner face of the cam $B^9$, said plate and pawl rising and falling during each rotation of the main shaft. As the plate descends a block $B^{20}$, fastened to the column A, as shown in Figs. 1 and 1ª, acts to detach the pawl or engaging device from the ratchet-teeth, letting the spring $C^{14}$, surrounding the rod $C^2$, act to elevate the horn and cause it to clamp the stock S, of whatever thickness, firmly between it and the under side of the foot-plate D, the protector being driven into the stock—a heel or sole—when so clamped. The plate $C^9$ and its pawl are raised immediately after a protector has been driven, and as it first starts the pawl immediately engages a tooth then opposite its end in the plate $C^{16}$ and effects the lowering of the horn to release the stock in order that it may be fed over the horn, the descent of the horn from the position in which it was left at its last rise being always for the same distance. When the machine comes to rest, the pawl $C^{18}$ is always disengaged from the teeth of the plate by the block $B^{20}$. (See Fig. 1ª.)

The operator may depress the horn to take off or put a shoe on said horn by putting his foot on the treadle D', pivoted at $C^4$, the inner end of the said treadle acting against the lever $C^3$, and a shoe having been applied the operator removes his foot from said treadle, letting the spring $C^{14}$ act to immediately raise the horn to clamp the work.

The head $A^3$ has at its front face a flange $A^{3\times}$, to which is secured by suitable bolts $D^2$ a face-plate $D^3$, having a driver-bar guide $D^4$, which receives a driver-bar $D^5$, provided with a driver $D^6$. The upper end of the driver-bar has connected to it a link or stud $D^7$, acted upon by an arm $D^8$, pivoted at $D^9$ and acted upon by a spring $D^{10}$, which acts normally to depress or throw down the driver-bar and driver. The driver-bar has an attached block $D^{12}$, provided with a lug, which is acted upon by a cam $D^{13}$, attached to the front end of the main shaft, to lift said driver-bar, the latter being thrown down by the said spring $D^{10}$ whenever the cam passes the said lug. The main shaft has a pinion E, (see Fig. 10,) which engages a toothed gear E', fast on a shaft $E^2$, supported in suitable bearings in the head, said shaft having, as shown, a belt-pulley $E^3$, which drives a belt $E^4$, extended over a second pulley $E^6$, fast on a shaft $E^7$, extended through a bearing $E^8$, fixed to the head, said shaft being rotated and carrying with it the pot $E^9$, containing the protectors, said pot having suitable buckets $e$, which lift the protectors and drop them onto an inclined shelf $e'$, held in fixed position by a screw $e^2$, inserted in a plate $e^3$, attached to said bearing $E^8$, from which shelf said protectors fall onto the upper edge of the raceway.

The raceway $E^{14}$ herein shown, of whatever form, presents a fin, the receiving end $e^4$ of which is supplied with protectors from the shelf $e'$ in the hopper, said fin between its receiving end and its delivering end or protector-positioning portion $e^{14}$ having given to it a quarter-turn, (see Figs. 2 and 6,) so that a protector $e^5$, applied to the receiving end and straddling the fin, will ride thereon to said delivery end or positioning portion $e^{14}$ and during its passage will be turned into such position as to present the open end or wings of the protector toward the front of the machine or in the desired established position required for the work to be done. The fin has arranged a short distance from it and substantially parallel therewith a plate $e^{66}$, and covering said fin and overlapping the protectors thereon is a lip $e^7$, which keeps the said protectors from rising on said fin to fall off the same or to override each other. The positioning portion or delivery end of the raceway has an overlapping wing or lip $e^8$, which extends about the end of the fin, the interior of said wing acting to retain the protectors on said positioning portion, keeping the protectors, as herein shown, with their open ends in line at the front of the machine. (See Figs. 6 to 9.) The lip $e^8$ has an opening 3, and the plate $e^{66}$ has at a point above said opening an opening 4. The opening 4 receives in it an arrester $a$, shown (see Fig. 6) as a finger pivoted at $a'$ on a block $d$, to be described, and acted upon by a spring $a^2$, said spring normally acting to keep the end of said arrester in said opening 4 in contact, as shown, with the side of an endwise-moving protector, the said arrester being moved away from the said protector by a suitable pin or projection $a^3$, mounted on a carrier $a^4$, which is pivoted at $a^5$ and works in the slot $a^{8\times}$ in the block $d$. The carrier $a^4$ derives its movement from a link $a^6$, suitably jointed to the lower end of a lever or arm $a^7$, secured to one end of a rock-shaft $a^8$, carrying an arm $a^9$, (see Fig. 10,) provided with a roller or other stud, which enters an irregular groove in a cam $a^{10}$, fast on the main shaft. The arm or lever $a^7$ is shown as provided (see Fig. 6) with a guideway $a^{12\times}$, in which is free to be slid a block $a^{12}$, (see Fig. 2,) having a clamping-screw $a^{13}$, which enters a slot in a lever $b$, pivoted at $b'$ on the face-plate. The lower end of the lever $b$ is jointed by a pin $b^\times$ (see Figs. 2 and 6) to the end of a feed-slide $b^2$, slotted at $b^3$, (see Fig. 4,) so that said slide may be moved when it is desired to feed the shoe on the horn.

To feed the stock on the horn, the under side of the feed-slide is provided with a transverse guideway, in which is fitted a block $b^7$, (see Figs. 4 and 5,) which may be held in any adjusted position in said guideway by a clamping-screw $b^8$ or in any other usual or suitable manner. The block $b^7$ carries a stud $b^6$, on which is mounted a feed-wheel $b^4$, having an attached ratchet-wheel $b^5$, which is normally engaged by a detent-pawl $b^9$, acted upon by a spring $b^{10}$. As the slide is moved by the lever $b$ in the direction of the arrow, Fig. 4, the teeth of the feed-wheel are in engagement with the edge of the stock, a heel or sole lying on the horn, and feed it for the proper distance. By placing the fulcrum $b'$ on the lever $b$ out of line with the rock-shaft carrying the arm or lever $a^7$ and the adjacent clamping-screw $a^{13}$ I may by adjusting the block $a^{12}$ on the arm $a^7$ and in the slot of the lever $b$ readily vary the length of the throw of the lever $b$, and thereby regulate the feed-stroke as desired. During this feeding action the pawl $b^9$ prevents any rotation of the feeding-wheel; but when the slide is moved in the opposite direction the teeth of the wheel still in engagement with the said edge roll over said edge, the pawl at such time clicking over the ratchet-teeth. The slots $b^3$ of the slide receive guide-screws $c$, which enter by their threaded ends holes in the under side of the foot-plate D. (See Fig. 2.) The pivot $a^5$ of the carrier (shown as a headed stud, see Figs. 1 and 6) enters a hole in the block $d$, secured to the head $A^3$ by suitable screws $d'$. (See Fig. 1.) The bushing $a^{4\times}$ in the nose or foot plate constitutes a throat, and it has an inner wall $t^4$, shaped substantially as the exterior of the protector, and in practice the exterior of the protector will contact with said inner wall, and also an inner guide $t^5$, (shown clearly in Figs. 6 and 9,) said guide entering the space between the open end of each protector, as best shown in Fig. $7^a$, wherein I have represented the bushing detached with a protector within it, the inner guide $t^5$ acting to prevent any axial twisting or turning of the said protector and exactly positioning its wings or open end, so that each protector may be set uniformly with relation to all the others to present a symmetrical design. This bushing may be readily changed when the shape of the protector being driven is to be changed, the operator at the same time changing the raceway, if need be, to correspond with the protector to be driven.

The stop for the endmost protector of the series of protectors in the raceway, it holding said protector when the arrester $a$ is moved or withdrawn from the opening 4, (said stop also acting, if desired, as an ejector,) is represented as a finger $f$, pivoted at $f'$ on the carrier $a^4$, the stop having a stud $f^{2\times}$, with which is connected a spring $f^2$, the opposite end of the spring being herein shown as joined to a stud 7, connected with the block $d$. This invention is not, however, limited to mounting the stop or ejector upon the carrier. The free or acting end of the stop or ejector is beveled at its under side, as shown in Figs. 7 and 8, and said end enters the opening 3 in the wing $e^3$, the stop or ejector occupying a position in a plane somewhat lower than the plane in which the arrester is adapted to be moved, the acting end of said stop or ejector being distant from the acting end of the arrester a little more than the height of a protector. As the carrier is moved to the right, Fig. 9, the pin $a^3$ retires from the arrester, letting the spring $a^2$ move the same to enter the opening 4 and act against the side of the endwise-moving protector $e^5$ next the endmost one of the series. (See Fig. 8.) Said arrester may meet any part of the said protector between its ends and push it against the raceway, clamping the protector in position, and consequently any slight variation in the length of the protector does not in any way affect the correct operation of the arrester. After the arrester meets a protector, as described, the carrier in its further movement to the right, Fig. 8, causes the inner end of the stop or ejector $f$ to contact with the plate $d$, which turns the ejector sufficiently to move its acting end from under the endmost protector of the series of protectors on the raceway-positioning portion, permitting the endmost protector to drop and rest upon the smooth or flat protector-sustaining portion of the carrier $a^4$, and in the further movement of the carrier to the right the ejector is further turned to uncover the recess in the carrier that the driver may act to drive the protector. During this movement of the carrier to the right it will be supposed that the space or recess 5 therein contains a protector and that as soon as the carrier arrives in the position shown in Fig. 8 the protector therein descends and enters the opening or passage in the foot-plate. As the carrier is returned from the position in which it delivered a protector to be driven or is moved to the left from the position Fig. 8 the protector, resting on the protector-sustaining portion of the carrier and still held in position by the positioning portion of the raceway, is permitted to leave said positioning portion and enter the space 5 of the carrier when said space arrives under the raceway and the inner guide $t^8$ in said space arrives in a position in which it is substantially alined with relation to the protector-positioning portion $e^{14}$, said protector entering the space 5, resting at its lower end upon the upper side of the foot-plate D, as in Fig. 7, all ready to be moved by the carrier into position to enter the opening in the foot-plate. As the protector enters the space or recess 5 of the carrier the wings of the protector fall at opposite sides of the inner guide $t^8$. The delivery end $e^{14}$ of the raceway prevents any axial or twisting movement of the protector on its way from the raceway into the space 5 of the carrier. The carrier, having received a protector, is moved automatically, as herein shown, to the right to place the protector contained in its space 5 and straddling the inner guide $t^8$ in position over the protector-passage in the bushing $a^{4\times}$ of the foot-plate, so that the driver $D^6$ in its descent will meet the protector and drive it through the passage in the foot-plate into the stock lying on the horn, the inner guide $t^5$ of the passage in the foot-plate positioning the open end or wings of the protector, so that successive protectors may be driven uniformly. The driver having acted and having been elevated, the carrier is again moved to the left into the position Figs. 6 and 7.

In case the machine is being run rapidly and the protector should for any reason not drop quickly enough the end of the stop or ejector $f$, as the latter enters the slot 3 in the movement of the carrier to the left, will meet by its beveled under side the top of the protector then to enter the space 5, and in case said protector has not already descended by gravity fully into said space the ejector meets the upper end of the protector and pushes it positively into the space 5 of the carrier. When the ejector acts to push the endmost protector into the space 5, the upper end of the inner guide $t^8$ of said space 5 meets substantially the lower end of the positioning portion $e^{14}$ at the delivery end of the raceway, so that said protector is controlled positively while passing from the delivery end of the raceway into the space of the carrier, it meeting and resting upon the smooth side of the foot-plate D. The inner guides are not shown in Figs. 7 and 8, for the reason that the section-line $y\,y$, Fig. 6, so cuts the carrier as not to cross said inner guides; but they are clearly shown in Fig. 9. As the protector drops from the space 5 into the passage in the bushing $a^{4\times}$ in the foot-plate its lower end strikes the stock or leather S, on which the foot-plate D bears.

Referring to the drawings, Figs. 9 and $9^a$, showing the protector-receiving space in the carrier, and Figs. 6, $7^a$, and 9, showing the passage in the nose or foot plate, it will be noticed that said space and said passage each has a projection or inner guide to enter between the wings of a protector, and at each side of said inner guides there are abutments or shoulders with which may contact the ends of the wings of a protector. The ejector, as herein shown, acts to cover the protector in the space 5 of the carrier, keeping the protector therein from being overturned as the carrier is moved to put the protector in line with the driver, the ejector uncovering the protector just previous to the descent of the driver to drive the protector. The upper end of the raceway is extended into the pot $E^9$, and the pot receives protectors through the chute $o$. Just below the inclined table $e'$ I have located a dam $o'$, it being a piece of metal secured to the part $E^8$ by a suitable screw $o^2$, the lower end of said dam (see Fig. $2^a$) having a slot to embrace the raceway, said slot being sufficiently large to enable a single protector proper side up to pass through said slot onto said fin. This dam has a stud 22, on which is pivoted a wheel 23, having teeth that are struck one after the other by an inwardly-extended pin 24, carried by the revolving part $E^9$ of the pot or hopper, said wheel as it is rotated intermittingly acting to dislodge any surplus protectors lodged or accumulated at the upper end of the raceway. The dam and toothed wheel may be used in connection with a raceway employed to guide any fastenings to be driven.

In Figs. 11 and 13 I have shown a modified form of raceway, it presenting a thicker fin (marked $g$) to receive and guide a three-sided protector $g'$, the part of the raceway rising parallel to one side of said fin having an overlapping lip $g^2$.

In Figs. 12 and 14 I have shown a raceway having an extended lip $g^3$, and the fin is represented as presenting two surfaces, the one, $g^4$, being straddled by a part of the protector, while the other part, $g^5$, of the fin acts as a support for another portion of the protector $g^6$.

The protector $g^6$ (shown in Figs. 12, 14, and 15) has two incurves, as 14 and 15, either of which may straddle the fin $g^4$; but to enable either of said incurves to get over the said fin the pointed end of the protector must be directed toward the delivery end of the raceway.

The raceways in Figs. 11 and 12 will have at their delivery ends suitable slots in which may work, as described, an arrester and ejector.

In Fig. 16 I have shown, in cross-section, still another form of raceway, it presenting a fin $h$, with a tapered top or lip $h'$, overlapping the protector $h^2$, therein shown as V-shaped.

In the form in which I have so far specifically described my invention the protector has been shown as dropped into a space in a carrier, the end of the raceway being stationary with relation to the movable carrier; but in the modification of my invention contained in Figs. 17 to 20 I have shown the delivery end of the raceway $m$ as inserted within a bushing $m'$ of the carrier $m^2$, pivoted at $m^3$ between the foot-plate D and a block $m^4$, corresponding with the block $d$, before described, said carrier having connected to its rear end a link $m^5$, corresponding with the link $a^6$, before described.

Fig. 20 is a section of the raceway shown in Fig. 17 in the line $x^4$, and Fig. 19 is a section of said raceway in the line $x^6$ of Fig. 18.

The raceway in Figs. 17 to 20 consists of a curved bar $m$ and a fin $m^6$, the latter being straddled by the protector $m^7$, and the part $m$ covers and incloses the protector resting on the fin, shielding and covering it throughout the length of the raceway. This bar $m$ has an extension $m^9$, slotted at $m^{10}$, said slot embracing a fixed guiding screw or stud $m^{12}$, so that as said carrier is moved to effect the placing of a protector in the opening in the bushing $n$ of the foot-plate D the raceway may move in unison with said carrier, so that the lowermost protector on said raceway, it resting at such time on the upper side of the foot-plate, may drop directly into the passage in the bushing $n$ of said plate, and immediately thereafter and before the driver-bar is permitted to descend the carrier is returned into the position shown in Fig. 18, thus uncovering the passage, so that the driver may enter said passage, meet the protector then resting on the top of the heel or sole, and drive it directly thereinto. In this modification I need employ only one finger $n^2$ to control the delivery of the protectors, said finger being shown as L-shaped, pivoted at $n^3$ and having a projection $n^4$, which acts on the side of the protector next to the endmost one of the series and arrests it, thus keeping back all of the protectors above it while the endmost protector, already released and lying on the foot-plate, is being put into driving position, said finger performing substantially the functions performed by the arrester before described. This finger is acted upon by a spring $n^5$, attached at one end to a suitable stud 20 of the carrier, and when the free end of said finger meets a stationary part of the machine, as a part of the block $m^4$, the finger is moved to release the protector then arrested by it, letting all the protectors move so that the endmost one of the series will drop and rest on the top of the foot-plate, and as the carrier is moved to the right, Fig. 18, the spring $n^5$ again assumes control of the finger and causes it to act against the side of and arrest and hold the protector immediately behind the one next to be driven.

I believe that I am the first to devise a machine for inserting into leather or other material protectors or slugs having laterally-extending wings. I also believe that I am the first to construct an arrester to act against the sides of the endwise-moving protectors in succession preparatory to letting off the endmost protector of the series of protectors on the raceway. I also believe that I am the first to provide a carrier with an inner guide to stand between the wings of a protector while it is being taken from the raceway into position to be driven, and I also believe that I am the first to employ in a passage or opening for guiding a protector an inner guide to enter the space between the wings or end of the protector, and I desire to claim said inner guide broadly wherever it may be used and in whatever form it may be embodied.

Having described my invention, what I claim as new, and desire to secure by Letters Patent, is—

1. A raceway composed of a fin presenting a downturned delivery end to guide a series of protectors, means coöperating with said delivery end to keep said protectors thereon, and a device to release said protectors from the delivery end of said raceway.

2. In a machine of the class described, the following instrumentalities, viz: a raceway to receive, guide and present a series of winged protectors, a carrier having a protector-receiving space, means to move said carrier and put its space below the delivery end of said raceway, and a device coöperating with the endmost protector on said raceway to effect the passage of the protector from the raceway into the space of the carrier.

3. A raceway to receive and guide protectors, a carrier having a space to receive and position protectors with their wings in a determined direction, a foot-plate having an opening for the passage therethrough of a protector, a driver, and means to effect the covering of said protector in the space of said carrier while it is being moved.

4. A raceway to receive, guide and present a series of protectors or slugs, a carrier, means to move said carrier and put it below the delivery end of said raceway, a device to control the delivery from the raceway of the endmost protector thereon to said carrier, an arrester to act upon a protector on the raceway, means to move said device and arrester to insure the delivery of the endmost protector on the raceway and check the movement of the protector next back of it and those sustained behind it, and a driver occupying its elevated position while the carrier is being moved toward the raceway to receive a protector.

5. In a machine of the class described, a raceway adapted to be straddled by and guide a series of winged protectors, said raceway having at its delivery end a positioning portion, a lip surrounding said positioning portion to retain said protectors thereon, combined with means to let off said protectors singly from the end of said positioning portion holding back the protector next to the endmost one of the series and those back of it while the endmost protector is being delivered from the raceway.

6. In a machine of the class described, a raceway having at its delivery end a positioning portion to enter a space in a protector and an outer wall or lip to keep said protectors on said positioning portion; a carrier having a protector-receiving space to receive and embrace a protector; combined with an arrester adapted to act against the side of a protector on said positioning portion next behind the endmost protector to arrest said protector and those behind it; and a stop or ejector adapted to come under the endmost protector of the series of protectors on said positioning portion and hold back all of the protectors when the arrester is in its inoperative position, and to be subsequently moved to release the endmost protector while the arrester is in its operative position.

7. In a machine of the class described, a raceway having a fin to receive and guide protectors; and a lip overlapping said fin at its delivery end and embracing the exterior of said protectors and their wings, combined with an arrester, and a stop located below said arrester and adapted at times to arrest and then release the endmost protector, and means to operate said arrester and stop alternately.

8. A raceway having at its delivery end a protector-positioning portion which is straddled by a series of protectors, combined with an arrester and a spring to normally move said arrester to meet the side of a protector next to the endmost protector and hold the same in position, a carrier, and means actuated by it to move said arrester to release said protector that it may approach said carrier.

9. In a machine for driving protectors, a raceway to sustain and guide a series of protectors, a carrier to receive protectors from said raceway, a uniformly-moving arm to actuate said carrier, a feed-slide having a toothed stock-engaging device and a connected pivoted actuating-lever having a different center of movement from said arm; combined with an adjustable stud connected with said arm and lever, whereby by adjusting the stud the said lever actuated by said arm and the stock-engaging device may have their throw increased or diminished, as desired.

10. In a machine of the class described, a foot-plate having a protector-opening, a raceway adapted to receive, guide, and present a series of protectors, with their open ends in like position, and a movable carrier presenting a tongue to receive a protector from the raceway and put it in position in line with the opening of the foot-plate.

11. In a machine of the class described, a device presenting a tongue to be straddled by a protector having laterally-extending wings and provided with an abutment to position the ends of said wings, a raceway to supply protectors to said tongue, and means to move said device to transfer a protector into driving position.

12. In a machine for inserting winged protectors or slugs into heels or soles of boots and shoes, a driver, a raceway, a device to transfer slugs from the raceway into position to be driven, said device having an inner guide adapted to be embraced by a slug, means to support the leading end of said slug while embracing said guide, and means to actuate said device to transfer said slugs into position to be driven.

13. In a machine for inserting protectors or slugs, a driver and means to guide protectors while they are being driven, said means having an inner guide to enter the space between the wings of a protector.

14. A foot-plate having a protector-passage to receive a protector or slug, said passage having extended partially through it an inner guide to enter the space at the open end of a protector to prevent the latter from turning in said passage, combined with a driver-bar and driver, and a movable horn to support and clamp the stock against said foot-plate while the driver acts to drive a protector into the stock.

15. In a machine for inserting protectors or slugs, a foot-plate having a throat provided with an inner guide to enter the open end of a protector, a driver, a raceway, a carrier having a recess to receive a protector from the end of the raceway, means to permit said protectors to slide off said raceway one at a time and enter directly the recess of the carrier, and means to actuate said carrier to take a protector from the raceway and put it in position to be acted upon by said driver.

16. In a machine for inserting protective slugs into the soles or heels of boots or shoes, a raceway, a driver, and a device to transfer slugs from the raceway into position to be driven, said device having a tongue to enter the space between the wings or open ends of the slugs, and means to actuate said device.

17. A raceway to sustain and guide protectors, a driver, a movable carrier having a guide adapted to be put in line with the open ends of the protectors guided by the raceway, means to permit the escape of said protectors one after another from said raceway to the said guide, and means to move said carrier to place a protector in position to be driven.

18. In a machine of the class described, a foot-plate provided with a protector-passage presenting an inner guide to enter the space of and position a protector to be driven, a device to put a protector in position above said protector-passage, and a suitable driver-bar and driver to drive a protector.

19. A raceway having a fin to enter the space between the wings of a series of protectors; an arrester coöperating with the protector next behind the endmost protector of the series of protectors on the fin; a stop for the endmost protector; means to remove said stop from under said protector; a carrier having a recess and an inner guide standing in said recess substantially in line with the fin of said raceway, whereby a protector released from said raceway may enter the recess of the carrier and straddle the inner guide thereof.

20. In a machine of the class described, a carrier having a protector-receiving recess presenting abutments to act as stops for the winged ends of a protector, and an inner guide on said carrier to be straddled by said wings.

21. A raceway presenting a fin to sustain and guide protectors and keep their wings in controlled position; a carrier having a space to receive, embrace and convey protectors from the raceway into position to be driven, an arrester, and an ejector, the latter acting against a protector leaving the raceway to enter the carrier.

22. In a machine of the class described, the following instrumentalities, viz: a raceway; a carrier having a protector-receiving space presenting a wall to surround the body of the protector and form an abutment for the ends of its vertically-positioned wings, a foot-plate having a protector passage or throat, means to actuate said carrier, a driver, and means to actuate it to drive a protector from the carrier and foot-plate into the stock.

23. In a machine of the class described, a movable carrier having a protector-sustaining surface and a recess, combined with means to deliver a protector on said surface, and means to move said carrier while the protector rests thereon to bring the recess of the carrier under the protector that the latter may enter said recess.

24. In a machine of the class described, a raceway to control protectors, a carrier having a recess to receive and surround a protector, means independent of the carrier to deliver the protectors into the recess of the carrier, and a foot-plate provided with a changeable bushing having a passage shaped to correspond with the exterior of the protector to be driven.

25. In a machine of the class described, a raceway presenting a positioning portion adapted to be straddled by and guide a series of protectors, and a lip embracing the endmost protector and its wings while on said positioning portion thereby guiding said protector; combined with a foot-plate having a protector-opening, a carrier having a protector-receiving space, and means to move said carrier and put its space under the said positioning portion to receive a protector and move said protector into position above the protector-opening in said foot-plate.

26. In a machine of the class described, a raceway having at its end a protector-positioning portion straddled by the protectors to thus control the position of the open ends of the protectors and the direction in which their wings extend, combined with a carrier having a recess to embrace the exterior of each protector as it is delivered from the raceway, means to move said carrier, and means to prevent any axial turning of the protectors while being moved by the carrier.

27. In a machine of the class described, a raceway to receive and guide protectors, a carrier provided with a space to receive and inclose said protectors, means to move said carrier to and fro, a foot-plate having a passage provided with an inner guide entering the open end of and positioning each protector, a suitable support for the stock, and means to drive a protector from the carrier into the stock.

28. In a machine for inserting protectors, a raceway to receive and guide protectors, an ejector to sustain and release in turn the foremost protector in the raceway, an arrester to sustain and release in turn the next protector in the raceway, actuating means for said ejector and said arrester, a driver and a carrier having an inner guide to receive protectors from said raceway and place them in position to be driven.

29. The combination with a raceway and a foot-plate having a throat provided with an inner guide extending partially through it, of a carrier having an inner guide to be straddled by a protector, and means to move said carrier intermittingly to and fro between said raceway and said throat.

30. A foot-plate to bear upon the surface of the stock, a transversely-movable feed-slide located below said foot-plate, a block carried by said slide and adjustable transversely thereon and carrying a feed-wheel, the adjustment of the block exposing more or less of the acting edge of the feed-wheel beyond the edge of the slide.

31. In a machine of the class described, a raceway having at its delivery end a vertically-placed fin constituting a protector-positioning portion, and a suitable exterior guide keeping said protectors on said positioning portion, combined with a carrier having a tongue adapted to be embraced by each protector in succession as it leaves said positioning portion, and means to move said carrier to transfer a protector into position to be driven.

32. A raceway having its delivery end shaped to surround the exterior of a protector, having laterally-extending wings, said raceway having a positioning portion standing in the central part of the protector between its wings, whereby the protectors have their positions established uniformly as they leave the raceway.

33. In a machine for inserting protectors having laterally-extending wings, a foot-plate having a protector-receiving recess, and an inner guide to enter between and position the wings of a protector.

34. In a machine for inserting protective slugs, a carrier having an opening to receive a slug, and an inner guide to enter the open end of the slug.

35. A carrier having a protector-receiving space, a raceway having at its delivery end a substantially vertically arranged protector-positioning portion and an external guide to maintain a series of protectors thereon and prevent any twisting or axial rotation thereof as the endmost protector of the series enters the space of said carrier.

36. In a machine of the class described, a raceway presenting a fin to be embraced by and guide winged protectors, a carrier having an inner guide to receive a protector from said fin, a foot-plate having a passage to receive a protector from said carrier, a support for the stock, a driver, and actuating means therefor.

37. In a machine of the class described, a raceway having its delivery end arranged to constitute a protector-positioning portion, combined with an external lip or device embracing the endmost protector on said positioning portion and by contact with the outer side of said protector keeping it on said positioning portion as the protector leaves the end thereof.

In testimony whereof I have signed my name to this specification in the presence of two subscribing witnesses.

BENJAMIN F. MAYO.

Witnesses:
GEO. W. GREGORY,
MABEL PARTELOW.